(12) United States Patent
Bieswanger et al.

(10) Patent No.: US 8,892,916 B2
(45) Date of Patent: Nov. 18, 2014

(54) DYNAMIC CORE POOL MANAGEMENT

(75) Inventors: Andreas Bieswanger, Ehningen (DE); Andrew Geissler, Pflugerville, TX (US); Hye-Young McCreary, Liberty Hill, TX (US); Freeman L. Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1870 days.

(21) Appl. No.: 12/186,680

(22) Filed: Aug. 6, 2008

(65) Prior Publication Data

US 2010/0037038 A1 Feb. 11, 2010

(51) Int. Cl.
*G06F 1/32* (2006.01)
*G06F 9/46* (2006.01)
*G06F 9/50* (2006.01)

(52) U.S. Cl.
CPC ............ *G06F 1/3203* (2013.01); *Y02B 60/144* (2013.01); *Y02B 60/1278* (2013.01); *G06F 1/329* (2013.01); *G06F 9/5094* (2013.01); *Y02B 60/142* (2013.01); *G06F 1/3287* (2013.01); *G06F 9/5083* (2013.01); *Y02B 60/1282* (2013.01)
USPC ........... 713/320; 713/300; 713/330; 713/340; 718/102; 718/105

(58) Field of Classification Search
CPC ..... G06F 9/3851; G06F 1/3203; G06F 1/329; G06F 11/0724; G06F 1/3287; G06F 1/3296
USPC ........... 713/300, 320, 330, 340; 718/102, 105
See application file for complete search history.

(56) References Cited

U.S. PATENT DOCUMENTS

| 4,843,541 | A | 6/1989 | Bean et al. |
| 5,253,344 | A | 10/1993 | Bostick et al. |
| 5,996,026 | A | 11/1999 | Onodera et al. |
| 6,052,708 | A | 4/2000 | Flynn et al. |
| 6,711,691 | B1 * | 3/2004 | Howard et al. ............... 713/300 |
| 7,065,761 | B2 | 6/2006 | Foster et al. |
| 7,174,467 | B1 * | 2/2007 | Helms et al. .................. 713/300 |
| 7,185,086 | B2 | 2/2007 | Bodapati et al. |

(Continued)

FOREIGN PATENT DOCUMENTS

WO WO 02/073396 9/2002

OTHER PUBLICATIONS

Songnian Zhou et al., "Processor Pool-Based Scheduling for Large-Scale NUMA Multiprocessors," ACM. Toronto, Ontario, Canada, 1991, pp. 133-142.

*Primary Examiner* — Michael J Brown
(74) *Attorney, Agent, or Firm* — Stephen R. Tkacs; Stephen J. Walder, Jr.; Parashos T. Kalaitzis (57) ABSTRACT

Mechanisms for dynamically managing core pools are provided. The mechanisms measure the amount of a computational load on a computing device. One way of measuring the load may consist of executing a number of instructions, in a unit of time, with numerous cores of the computing device. The mechanisms compare the number of instructions executed with specific thresholds. Depending on whether the number of instructions is higher or lower than the thresholds, the computing devices may respond by activating and deactivating cores of the computing devices. By limiting execution of instructions of the computing device to a smaller number of cores and switching one or more cores to a lower power state, the devices may conserve power.

20 Claims, 5 Drawing Sheets

(56) References Cited

U.S. PATENT DOCUMENTS

| | | | |
|---|---|---|---|
| 7,437,581 B2 * | 10/2008 | Grochowski et al. | 713/320 |
| 2005/0071701 A1 * | 3/2005 | Luick | 713/320 |
| 2005/0132051 A1 | 6/2005 | Hill et al. | |
| 2006/0136680 A1 | 6/2006 | Borkenhagen et al. | |
| 2007/0214483 A1 | 9/2007 | Bou-Abboud | |
| 2008/0034249 A1 | 2/2008 | Husain et al. | |
| 2008/0104610 A1 | 5/2008 | Norton et al. | |
| 2008/0163206 A1 * | 7/2008 | Nair | 718/1 |
| 2009/0228541 A1 * | 9/2009 | Barsness et al. | 709/201 |

* cited by examiner

DYNAMIC CORE POOL MANAGEMENT

BACKGROUND

The present disclosure relates generally to computing devices and more particularly to dynamic core pool management of computing devices. Common types of computing devices are desktop computers and server systems. Designers of computing devices, like next-generation servers, spend considerable amounts of time analyzing and designing system-level power management. Without system-level power management, the computing devices are not able to stay within design constraints and other limitations, such as the limitations imposed by data center power and cooling systems. In addition, current system-level power management elements have inefficiencies. Such inefficiencies are important, given that energy is becoming an increasingly expensive commodity. Lawmakers and consumers are demanding more power-efficient computing devices, as well as power-manageable computing devices.

In many modern computing devices processors consume relatively large quantities power. As processors consume larger and larger quantities of power, processors correspondingly generate more and more heat. In other words, processor design trends are improving performance but also increasing power consumption and heat density. In server systems, the pool of processors generates most of the heat of the systems. So controlling the power consumed by processors, especially when the system load is relatively low, often proves to be important when achieving energy efficiency.

Current solutions for controlling processor power in computing devices generally fall into one of three categories. The first category comprises low-level gating techniques that detect one or more portions of a processor are idle. Low-level gating mechanisms reduce or turn off power to the idle circuits to conserve energy.

A second category of controlling power in a computing device comprises processor or clock throttling. Throttling injects "dead" cycles into processor pipelines or in the processor clock to reduce the activity level of the processor. For multiple-core processors, throttling is generally applied at the level of individual processor cores. This technique offers a quick way to reduce power, but the amount of power reduction from throttling is limited. Plus, throttling generally has a negative impact on processor performance.

The third category comprises processor scaling. Dynamic voltage scaling and dynamic frequency scaling (DVFS) tend to be effective over a somewhat limited range. The range of using DVFS is bounded due to frequency and voltage requirements of the processors in a system.

BRIEF SUMMARY

Following are detailed descriptions of embodiments depicted in the accompanying drawings. The descriptions are in such detail as to clearly communicate various aspects of the embodiments. However, the amount of detail offered is not intended to limit the anticipated variations of embodiments. On the contrary, the intention is to cover all modifications, equivalents, and alternatives of the various embodiments as defined by the appended claims. The detailed descriptions below are designed to make such embodiments obvious to a person of ordinary skill in the art.

Generally speaking, methods, apparatuses, and computer program products to dynamically manage core pools are contemplated. Modern processors and systems generally have multiple computing engines for executing applications and performing other work. These computing engines are often called "cores". Some embodiments generally comprise executing a number of instructions, in a unit of time, with number of cores of a computing device. These embodiments further involve detecting whether the number of instructions executed in the unit of time is less than a threshold and, if so, limiting execution of instructions of the computing device to a smaller number of cores and switching one or more cores to a lower power state. Detecting whether the number of instructions executed is less than the threshold and limiting execution of instructions to the smaller number of cores may allow the embodiments to adjust the number of cores executing instructions and operate more efficiently.

Alternative embodiments may also perform dynamic voltage scaling and/or dynamic frequency scaling of one or more cores of the computing device. Some embodiments may also switch power states of processors in addition to switching power states of the cores. Additionally, numerous embodiments involve changing or remapping one or more virtual processor units when limiting execution of instructions to the second number of cores.

Further embodiments comprise apparatuses having a demand determiner to determine a demand of a pool of cores, wherein the demand comprises execution of a number of instructions in a unit of time by the pool of cores. These apparatuses have a core switcher to switch power states of one or more cores in the pool and a power controller to cause the core switcher to switch a core of the pool of cores from a higher power state to a lower power state in response to the demand determiner determining the demand is less than a demand threshold. Alternative embodiments may comprise an apparatus with a virtual processing unit controller to change a number of virtual processing units available to execute instructions, based on the determined demand.

Further embodiments comprise a computer program product comprising a computer usable medium having a computer readable storage medium including instructions that, when executed by at least one processor execute a number of instructions in a unit of time via a plurality of cores. The instructions will also detect whether the number of executed instructions is less than a threshold and, if so, change a power state of a core in the plurality of cores from a higher power state to a lower power state. The apparatuses may change the power states in response to the number of executed instructions being less than the threshold, as well as change mapping of virtual processing units for the plurality of cores.

BRIEF DESCRIPTION OF THE SEVERAL VIEWS OF THE DRAWING

Aspects of the various embodiments will become apparent upon reading the following detailed description and upon reference to the accompanying drawings in which like references may indicate similar elements.

DETAILED DESCRIPTION

The following is a detailed description of novel embodiments depicted in the accompanying drawings. The embodiments are in such detail as to clearly communicate the subject matter. However, the amount of detail offered is not intended to limit anticipated variations of the described embodiments. To the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

In many of the following paragraphs, numerous embodiments are discussed using the term "server". The terms "computing device" are also used. Even so, the use of these terms is for the sake of explanation for those possessing ordinary skill in the art. The teachings herein may generally be employed with numerous types of computing devices that have multiple cores and/or multiple processors.

Further, numerous embodiments are discussed using the terms "cores" and "pool of cores", while other embodiments may alternatively use the terms "processors" and "pool of processors". People skilled in the art generally use the term "processor" to refer to a single physical integrated circuit chip that is either inserted into a socket of a main electronics board of a computing device, or directly soldered to the main board. The term "core" may generally refer to a group of circuit elements in a processor that executes instructions. A processor may contain one or more cores. Additionally, a processor may contain other elements separate from the cores. For example, a processor may have two cores coupled with a single cache memory unit. In general, however, the terms "core" and "processor" refer to physical elements that perform instruction execution for a computing device and are frequently interchanged by those possessing ordinary skill in the art. Consequently, both terms may often be substituted with one another, even though the terms may not be technically equivalent.

Various embodiments involve measuring the amount of a computational load on a computing device. Example computing devices that may execute the instructions are server systems, desktop computers, and laptop computers. One way of measuring the load may consist of executing a number of instructions, in a unit of time, with numerous cores of the computing device. These embodiments may compare the number of instructions executed with specific thresholds. Depending on whether the number of instructions is higher or lower than the thresholds, the computing devices may respond by activating and deactivating cores of the computing devices. By limiting execution of instructions of the computing device to a smaller number of cores and switching one or more cores to a lower power state, the devices may conserve power.

Figure 1:
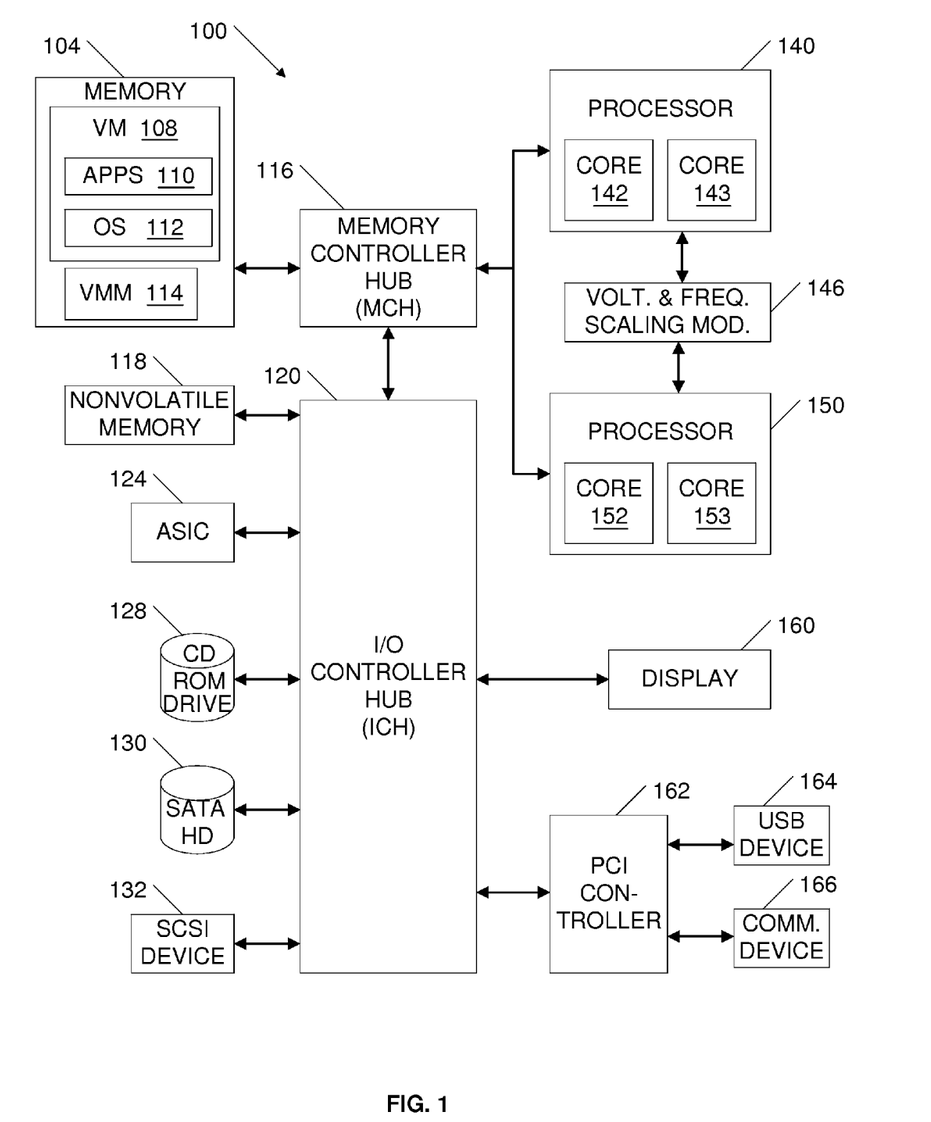
FIG. 1 depicts an embodiment of a system that may perform dynamic management of a core pool, comprising two processors, a virtual machine manager, a display, and various input-output devices.

Turning now to the drawings, FIG. 1 depicts a system 100 with two processors, 140 and 150, a memory controller hub (MCH) 116, memory 104, and an I/O controller hub (ICH) 120. In numerous embodiments system 100 may comprise a server. In other embodiments system 100 may comprise a different type of computing device, such as a mainframe computer or part of a mainframe computer system, a desktop computer, or a notebook computer.

Processors 140 and 150 may have a number of cores, such as cores 142, 143, 152, and 153, which may be coupled with cache memory elements of processors 140 and 150. For example, processor 150 may have cores 152 and 153 coupled with internal processor cache memory. The number of processors and the number of cores may vary from embodiment and embodiment. For example, while system 100 has two processors, 140 and 150, alternative embodiments may have other numbers of processors, such as one, four, eight, or some other number. The number of cores of a processor may also vary in different embodiments, such as one core, four cores, five cores, or some other number of cores.

As depicted in FIG. 1, system 100 may execute a number of applications 110 in memory 104. For example, system 100 may comprise part of a server system, such as a computing board, or blade server, in a rack-mount server. Processors 140 and 150 may execute operating instructions for programs and applications run by users of system 100. Applications 110 may comprise, e.g., a network mail program and several web-based applications, such as a word processing application and a computer aided design (CAD) application. As shown in FIG. 1, such software programs and related instructions may be stored in memory 104. Processors 140 and 150 may execute the instructions in memory 104 by interacting with MCH 116. The types of memory devices comprising memory 104 may vary in different embodiments. In some embodiments, memory 104 may comprise volatile memory elements, such as four 1-gigabyte (GB) dynamic random access memory (DRAM) sticks. In alternative embodiments, memory 104 may comprise nonvolatile memory. For example in some embodiments memory 104 may comprise a flash memory module, such as a 4 GB flash memory module.

Also as depicted in FIG. 1, system 100 may have a virtual machine manager 114, such as a hypervisor, that manages one or more virtual machines, such as virtual machine 108. Virtual machine 108 may comprise software that creates a self-contained operating environment. Virtual machine 108 may operate independently of, but in conjunction with, virtual machine manager 114. In the embodiment of FIG. 1, virtual machine manager 114 may comprise an application loaded into memory 104, separate from any operating system.

Virtual machine manager 114 may exist in different forms. For example, in one embodiment virtual machine manager 114 may comprise firmware coupled to processor 140 or processor 150. In another embodiment, virtual machine manager 114 may comprise a software application loaded within or after an operating system. That is to say, virtual machine manager 114 may comprise an application being executed by an operating system. Some embodiments may have no separate virtual machine manager, in which case the operating system may perform the functions of a virtual machine manager or hypervisor.

An operating system 112 of virtual machine 108 may process the instructions of applications 110. In processing the instructions of applications 110, cores 142, 143, 152, and 153 may comprise a core pool that system 100 uses to execute the instructions. As the demand of the applications changes with time, system 100 may change the number of cores which are active and inactive based on the demand. For example, in an alternative embodiment processor 140 and processor 150 may each have four cores, for a total of eight cores. Under heavy demand, virtual machine manager 114 may pool the eight cores together, making them all active and operating at full power. However, as the demand decreases, virtual machine manager 114 may reduce the number of cores in the pool of active cores from eight to seven cores, or to three cores, as examples.

For cores that virtual machine manager 114 deactivates, virtual machine manager 114 may conserve power by switching the deactivated cores from high power states to one or more lower power states. Additionally, depending on the embodiment, virtual machine manager 114 may also switch inactive processors to lower power states. For example, instead of two processors 140 and 150, an alternative embodiment may have four processors, each with multiple cores. Virtual machine manager 114 may reduce the number of cores in the pool of active cores as the demand decreases. In the process of reducing the number of active cores, virtual machine manager 114 may pool or group the active cores together in such a way as to reduce the number of active processors. Virtual machine manager 114 may, e.g., execute instructions of applications 110 and operating system 112 using only two of the four processors. Since two of the processors may be sitting idle due to low demand, virtual machine manager 114 may conserve power by placing the two processors into a sleep state until the demand increases.

While virtual machine manager 114 may conserve power by switching or changing states of cores and/or processors to low power states, system 100 may also employ other methods to conserve power. For example, system 100 may comprise a voltage and frequency scaling module 146. By using module 146 to dynamically scale operating voltages of processor 140 and/or processor 150, system 100 may conserve power by decreasing the operating voltage of the processors when the system load, or demand, is low. Similarly, system 100 may conserve power by decreasing the operating frequencies of processor 140 and/or processor 150 when demand is low. As demand increases, system 100 may use module 146 to increase the voltages or operating frequencies to respond to the increased demand.

While the embodiment depicted in FIG. 1 shows module 146 separate from processors 140 and 150, alternative embodiments may implement module 146 differently. For example, an embodiment may have two separate dynamic voltage and frequency scaling modules, with one module located in processor 140 and the second in processor 150. Some embodiments may only have one or more dynamic voltage scaling modules, without any modules to perform dynamic frequency scaling. Alternatively, some embodiments may only have one or more dynamic frequency scaling modules, without any modules to perform dynamic voltage scaling. Some embodiments may have one or more modules which perform combinations of voltage and frequency scaling. For example, an embodiment may have a dynamic voltage scaling module for processor 140, yet have a dynamic voltage and frequency scaling module for processor 150. Even further, some embodiments may have no dynamic voltage scaling modules and no dynamic frequency scaling modules.

Depending on the embodiment, system 100 may use the dynamic voltage and frequency scaling of module 146 independently from dynamic management of the core pool. For example, in one embodiment, virtual machine management 114 may perform the functions of dynamic management of cores 142, 143, 152, and 153 without input, or feedback, from module 146. Additionally, module 146 may perform dynamic voltage and frequency scaling of processors 140 and 150 without any input or control from virtual machine manager 114. Alternatively, in another embodiment, system 100 may coordinate the activities of dynamic voltage and frequency scaling with the activities of dynamic management of the core pool. For example, virtual machine manager 114 may control the dynamic voltage and frequency scaling for processors 140 and 150 by controlling or providing control information to module 146. Virtual machine manager 114 may limit the scaling performed by module 146 when, e.g., demand on system 100 is increasing and virtual machine manager 114 is activating additional cores in the pool to handle the increasing demand.

In many embodiments, dynamic voltage and frequency scaling of module 146 may operate in a significantly shorter timescale than the dynamic core pool management performed by virtual machine manager 114. For example, module 146 may perform the functions of dynamic voltage and frequency scaling for processors 140 and 150 within a time frame of 0.01 seconds to 1 or 2 seconds. Contrastingly, virtual machine manager 114 may perform the dynamic core pool management for cores 142, 143, 153, and 153 using a relatively longer time frame, such as 1 to 10 seconds. By performing the dynamic core pool management in a longer time frame, virtual machine manager 114 may avoid excessive overhead and instabilities by avoiding dynamic core pool management in the time frame of the voltage and frequency scaling, such as 10 millisecond intervals as alluded to above. Using longer intervals may also allow virtual machine manager 114 to conserve additional power, however, beyond the limits of power conservation provided by voltage and frequency scaling.

ICH 120 may allow processors 140 and 150 to interact with external peripheral devices, such as keyboards, scanners, and data storage devices. Programs and applications being executed by processors 140 and 150 may interact with the external peripheral devices. For example, processors 140 and 150 may present information to a user via a display 160 coupled to, e.g., an Advanced Graphics Port (AGP) video card. The type of console or display device may be a cathode-ray tube (CRT) monitor, a liquid crystal display (LCD) screen, or a thin-film transistor flat panel monitor, as examples. In some embodiments, a user or system administrator may use display 160 to view and change configuration information of virtual machine manager 114. For example, the system administrator may set up partitioning information for numerous virtual machines to be managed by virtual machine manager 114. The system administrator may also set up timing information, such as how long system 100 should delay before evaluating system load for opportunities to save power via dynamic management of cores in the pool, different threshold values for switching power states of cores and processors, and which cores and/or processors may be dedicated and excluded from being affected by dynamic management of cores in the pool.

In various embodiments, ICH 120 may allow processors 140 and 150 to store and retrieve data from a universal serial bus (USB) device 164 via a Peripheral Component Interconnect (PCI) controller 162. In some embodiments, processors 140 and 150 may store and retrieve configuration information for the dynamic management of cores. For example, system 100 may comprise a blade server in a system with 10 other similar blade servers. The system administrator of system 100 may copy the configuration information associated with the dynamic management of cores 142, 143, 152, and 153. The system administrator may then take the configuration to the other blade servers and copy the configuration information to those blade servers. The purpose of use of USB 164 may vary in different embodiments. For example, in one embodiment USB 164 may be used to store and retrieve usage information, such as automated operating and maintenance logs. Additionally, some embodiments may have more than one USB element, while other embodiments may have no USB elements.

Processors 140 and 150 may also send and receive data via PCI controller 162 and communication device 166. Communication device 166 may comprise, e.g., a network card. System 100 may allow one or more executing applications to communicate with other computing devices. For example, system 100 may use logical partitioning to make system 100 appear as two or more independent servers. Each logical partition may operate as an independent logical server. For instance, virtual machine 108 may reside in one logical partition. System 100 may enable one or more of the logical partitions to communicate with other computing devices using communication device 166 via virtual Ethernet links. Alternative embodiments may use communication device 166 differently. For example one embodiment may utilize a virtual fiber-optic bus while another embodiment may employ a high-speed link (HSL) optical connection for communication device 166.

In addition to USB 164 and communication device 166, ICH 120 may also allow applications of system 100 to interact with Advanced Technology Attachment (ATA) devices, such as ATA hard drives, digital versatile disc (DVD) drives, and compact disc (CD) drives, like CD read only memory (ROM) drive 128. As shown in FIG. 1, system 100 may have a Serial ATA (SATA) drive, such as SATA hard drive 130. SATA hard drive 130 may be used, e.g., to store numerous operating systems for various partitions, device drivers, and application software for system 100. For example, in some embodiments SATA hard drive 130 may store AIX®, Linux®, Macintosh® OS X, Windows®, or some other operating system.

ICH 120 may allow applications in partitions managed by virtual machine manager 114 to store and retrieve information in nonvolatile memory 118, as well as interact with an application specific integrated circuit (ASIC) 124. For example, nonvolatile memory 118 may comprise flash memory in some embodiments while comprising programmable read-only memory (PROM) or another type of memory in other embodiments. Nonvolatile memory may be used, e.g., to store partition configuration information for virtual memory manager 114.

ICH 120 may allow applications in partitions managed by virtual machine manager 114 to store and retrieve data using a Small Computer Systems Interface (SCSI) device 132. Even though virtual machine manager 114 may consolidate software and hardware threads to a smaller number of cores and/or a smaller number of processors to conserve power, virtual machine manager 114 may nonetheless provide the dynamic configuration associated with remapping virtual processing units without interrupting the ability for the applications to interact with devices like nonvolatile memory 118, ASIC 124, CD-ROM drive 128, SATA hard drive 130, and SCSI device 132.

System 100 may also dynamically manage a core pool in conjunction with types of hardware not depicted in FIG. 1, such as a sound card, a scanner, and a printer, as examples. Conversely, in different embodiments, system 100 may not comprise all of the elements illustrated for the embodiment shown in FIG. 1. For example, some embodiments of system 100 may not comprise SCSI device 132, PCI controller 162, USB 164, CD-ROM drive 128, and ASIC 124.

As processors 140 and 150 execute instructions of applications in memory 104, which may interact with numerous peripheral devices, virtual machine manager 114 may perform the functions of dynamic core pool management. Virtual machine manager 114 may perform dynamic core pool management by matching the number of active cores in cores 142, 143, 152, and 153 to the load of system 100. For example, cores of system 100 that are inactive may not require the amount of power provided for an idle power state. System 100 may comprise an advanced system, capable of switching the inactive cores into very low-power states or turning the inactive cores off entirely. In other words, system 100 may improve the power efficiency of system 100 by matching the power consumed by processors 140 and 150 to the amount of load on system 100.

To perform the functions of dynamic core pool management, virtual machine manager 114 may detect that the total load on cores 142, 143, 152, and 153 is sufficiently low, consolidate the execution of instructions onto a smaller set of cores, and switch the cores with little or no work from high power states into low power states. Virtual machine manager 114 may also group inactive cores together, to both minimize the number of active processor chips and to take advantage of the additional power savings afforded some processors when the processors are switched to a low power state. In other words, switching all cores of a processor to low power states may conserve a certain amount of power. However, switching a processor containing inactive cores to a processor low power state may conserve even more power than the savings provided by switching only the cores to low power states.

Many of the low power states of cores 142, 143, 152, and 153 may not allow system 100 to execute instructions on the cores. However, virtual machine manager 114 may activate the cores one at a time when needed without forcing system 100 to restart. Stated differently, virtual machine manager 114 may allow system 100 to remain logically active, processing work, but enable additional power conservation during periods of inactivity, which may be more power conservation than can be achieved by dynamic voltage and frequency scaling alone. As the load on system 100 rises, virtual machine manager 114 may switch cores that were switched to the low power state back to higher power states and begin assigning work to the activated cores, spreading the load across a larger number of processing elements. Virtual machine manager 114 may also enable system 100 to execute fewer instructions, but at full speed, in situations where system 100 may need to minimize latency or response time. Executing fewer instructions at full speed may be useful when the number of jobs or transactions to complete is small, but system 100 may need to complete the transactions quickly.

Figure 2A:
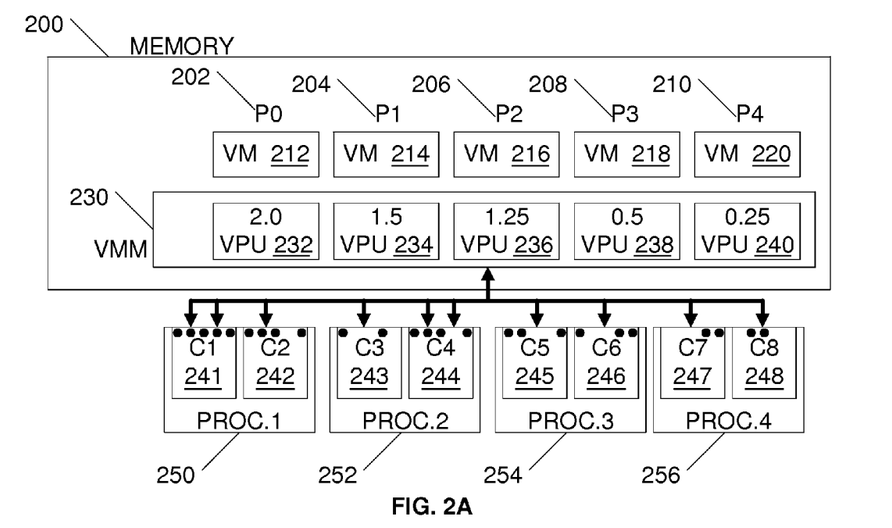
FIGS. 2A-2B illustrate how an embodiment may dynamically allocate cores of a pool, change the execution of instructions to a smaller set of cores, and switch deactivated cores to lower power states.
Figure 2B:
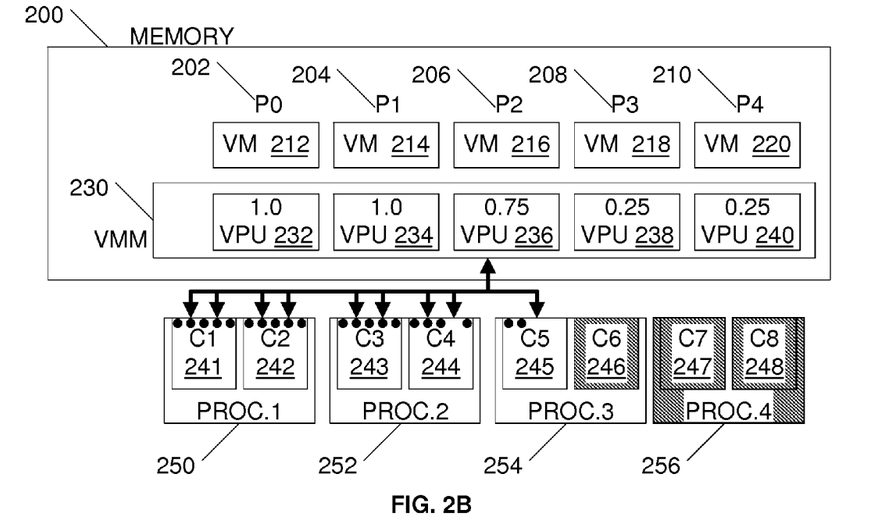

To provide a more detailed illustration of how a system or an apparatus may perform dynamic management of a core pool, we turn now to FIGS. 2A and 2B. FIGS. 2A and 2B illustrate how an embodiment may dynamically allocate cores of a pool of cores, change the execution of instructions from a larger set of cores to a smaller set, and switch deactivated cores to lower power states. For example, memory 200 may comprise memory of an apparatus or a system, such as memory 104 of system 100 in FIG. 1. Virtual machine manager 230 and processors 250, 252, 254, and 256 may correspond to virtual machine manager 114 and processors 140 and 150, respectively. Similarly, virtual machines 212, 214, 216, 218, and 220 may correspond to virtual machine 108. As noted before, the number of processors, the number of cores, and the number of virtual machines may vary from embodiment to embodiment.

Processors 250, 252, 254, and 256 may comprise physical processors. In an embodiment, each processor may have a plurality of cores. In the embodiment of FIGS. 2A and 2B, each processor has two cores. Processor 250 has cores 241 and 242; processor 252 has cores 243 and 244; processor 254 has cores 245 and 246; and processor 256 has cores 247 and 248. Processors 250, 252, 254, and 256 may comprise a shared processor pool. The shared processing pool may allow a system or apparatus to assign partial processors to a logical partition. In other words, a system may hold physical processors 250, 252, 254, and 256 in a shared processing pool and share processors 250, 252, 254, and 256, as well as the cores of the processors, among numerous logical partitions. In FIG. 2A, for example, a system may share processors 250, 252, 254, and 256 among partitions 202, 204, 206, 208, and 210.

In an embodiment, virtual processors may comprise whole numbers of concurrent operations which an operating system can utilize. The processing power may be conceptualized as being spread equally across these virtual processors. Selecting a specific number of virtual processors may depend on the workload of the partition. In the embodiment of FIG. 2A, the system has 4 physical processors in the shared pool, specifically processors 250, 252, 254, and 256. The 4 physical processors have 8 cores 241-248 which may provide a total of 8.00 virtual processing units.

Virtual machine manager 230 may distribute the processing power among the five logical partitions, partitions 202, 204, 206, 208, and 210, in the manner illustrated in FIG. 2A. Partition 202 has 2.00 processing units and 2 virtual processors (element 232); partition 204 has 1.5 processing units and 2 virtual processors (element 234); partition 206 has 1.25 processing units and 2 virtual processors (element 236); partition 208 has 0.5 processing units and 1 virtual processor (element 238); and partition 210 has 0.25 processing units and 1 virtual processor (element 240). As one will note, the sum of the processing units of the five logical partitions is less than or equal to the total number of processing units in the shared pool, 8, with the total number of virtual processors equaling 8.

As the system of FIG. 2A operates, the demand or total load may increase and decrease with the passage of time. FIG. 2A may represent a configuration of virtual processing units mapped for a specific load of the system at one instance in time. FIG. 2A depicts that core 241 is heavily loaded, which may correspond to executing a large number of instructions via numerous hardware threads, relative to the execution capability of core 241. For example, core 241 may be able to execute instructions via some number "n" of hardware threads, with 0 to n hardware threads being concurrently active based on the operation of core 241.

Contrasted with core 241, cores 243, 246, and 247 are less heavily loaded. An embodiment may periodically measure or determine the total load of the system after specific intervals or units of time, such as once every 5 seconds. For example, virtual machine manager 230 may detect that cores 245, 246, 247, and 248 of processors 254 and 256 are lightly loaded and are candidates for dynamic core pool management.

In performing dynamic core pool management, virtual machine manager 230 may change the mapping of virtual processors and virtual processing units to different processor cores. In changing the mapping of the virtual processing units, virtual machine manager 230 may consolidate the virtual processors onto a smaller number of processor cores and reduce the size of the core pool during times of light loading. Virtual machine manager 230 may also change the mapping of virtual processing units to spread them out over a larger number of cores and hardware threads when activating and adding cores to the core pool during periods of heavy demand.

As illustrated in FIG. 2B, virtual machine manager 230 may change the mapping of the virtual processing units among the logical partitions 202, 204, 206, 208, and 210. Virtual machine manager 230 may reduce the processing units for partition 202 from 2.0 processing units to 1.0 processing unit. Similarly, virtual machine manager 230 may reduce the processing units for partitions 204, 206, and 208 to 1.0, 0.75, and 0.25, respectively. Consequently, virtual machine manager 230 may reduce the number of virtual processors from 8 to 5, and remap the virtual processing units from cores 246, 247, and 248, packing the virtual processing units onto cores 241-245.

One may note that after the mapping change, all five partitions still have at least one processor. Under a different set of conditions, however, applications of a partition may be completely inactive. Consequently, virtual machine manager 230 may be able to suspend the operating system for the partition and change the mapping of virtual processors as well, reducing the number of virtual processors from 8 to 7, as an example.

In reducing and expanding the number of active processor cores, virtual machine manager 230 may pack the active cores together on a smaller number of chips or integrated circuits (ICs) to conserve power. As illustrated in the transition from FIG. 2A to FIG. 2B, virtual machine manager 230 may shift the loads from cores 246, 247, and 248 over to cores 241-245. As a result of shifting the loads and remapping the virtual processing units, cores 246, 247, and 248 may be executing no instructions. Consequently, virtual machine manager 230 may conserve power by switching cores 246, 247, and 248 from high power states to low power states. Additionally, depending on the embodiment, virtual machine manager 230 may also be able to switch the power state of processor 256 to a low power state, or potentially to a sleep mode, which may allow for even greater power conservation since cores 247 and 248 are inactive.

Various embodiments may use software control mechanisms, such as an operating system or a virtual machine manager, to switch cores from a very low power or off state to a higher power state. For example, each of the cores in FIG. 2A may be placed in one of seven different power states. One state, such as state 0, may comprise a core being fully active. A moderate amount of power may be conserved by placing the core into power state 2. In state 6, however, the core may be in a deep sleep mode, consuming a relatively small amount of power. Some low power states may be very restrictive or have relatively high amounts of latency to use for an idle condition of a core. Even so, such lower power states may offer significantly more power savings than the higher power states. Examples of such states include a deep sleep state, such as an Advanced Configuration and Power Interface (ACPI) C3 state.

In one or more embodiments, the processor or core architectures may offer two power states, one being available to individual cores on a per-core basis, and an even lower-power state that a whole processor IC, including all of the cores on the IC, can enter when all of the cores on the IC are inactive. In these various embodiments, with differing types of core and processor architectures having different power states, virtual machine manager 230 may be cognizant of the different power states of the cores and/or processors, as well as the different operating characteristics of the cores and/or processors. For example, even with the same nominal set of operating frequencies different processors may have different power characteristics. Some processors at a particular frequency may consume more power and may even need a higher voltage than other processors.

Virtual machine manager 230 may take into consideration the power savings offered by the individual power states, and processor/core operating characteristics, when determining how to redistribute the load among the cores. For example, processor 256 may comprise a high performance processor, whereas the other processor may comprise standard-type processors. Being a high performance processor, processor 256 may consume considerably more power than the other processors. As a consequence, virtual machine manager 230 may perform weighted calculations which tend to look for ways to shift load from processor 256 whenever possible and only use processor 256 when demand is extremely high.

In some embodiments, an operating system image may have a performance requirement that implies that when the operating system image executes, the operating system must execute on a minimum number of distinct hardware threads. This requirement, for example, may be due to assumptions that virtual processors are running simultaneously. Such a requirement is generally known as a gang scheduling requirement. To allow such embodiments to meet such gang scheduling requirements of the operating system images and associated applications, virtual machine manager 230 may assign a span value to each operating system image and, thus, to each partition containing such operating systems. For example, the span value of an operating system of virtual machine 212 may comprise a specific number of hardware threads to be allocated to partition 202 in order for the operating system to operate properly. Depending on the embodiment, the span may or may not be strictly less than the number of virtual processors mapped for the operating system. In general, virtual machine manager 230 may assign hardware threads and processor cores to partitions with spans greater than one in a manner that localizes the partition within a system to a small and contiguous set of cores.

Figure 3:
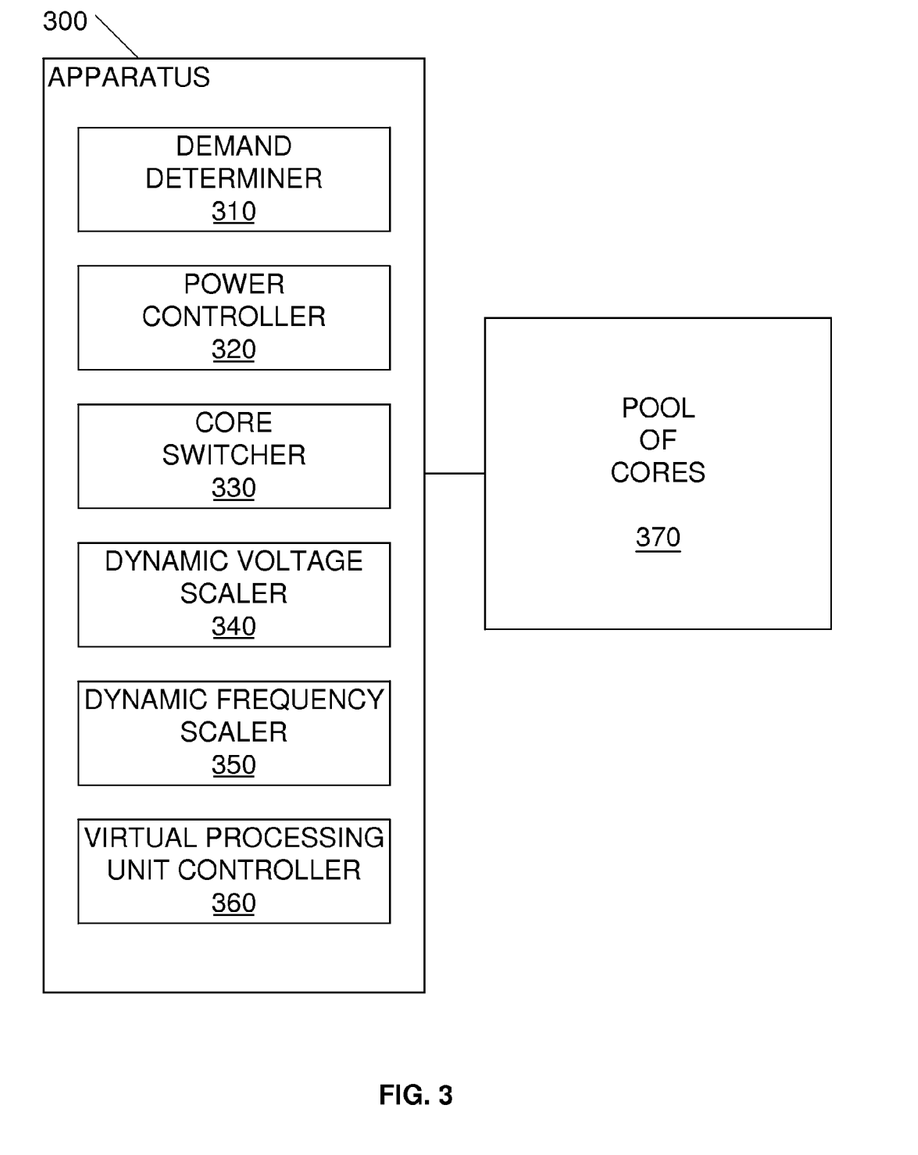
FIG. 3 depicts one embodiment of an apparatus that may dynamically manage a pool of cores, the apparatus comprising a demand determiner, a power controller, and a core switcher.

FIG. 3 depicts one embodiment of an apparatus 300 that may dynamically manage a pool of cores 370, comprising a demand determiner 310, a power controller 320, and a core switcher 330. One or more elements of apparatus 300 may be in the form of hardware, software, or a combination of both hardware and software. For example, in one embodiment, one or more of the modules of apparatus 300 may comprise software instructions of an application stored in a tangible medium, executed in memory by a processor. Apparatus 300 may comprise an element of a computing device, such as virtual machine manager 114, as a more specific example. In other words, one embodiment of apparatus 300 may comprise portions of stored code for an application, which may perform operations for dynamic core pool management for pool of cores 370, which may correspond to cores 142, 143, 152, and 153 shown in FIG. 1.

In alternative embodiments, one or more of the modules of apparatus 300 may comprise hardware-only modules. For example, apparatus 300 may comprise a portion of an integrated circuit chip coupled with processors 140 and 150. In these embodiments, apparatus 300 may comprise a dynamic core pool management module, which may be situated in a fashion similar to module 146.

Of the various embodiments, demand determiner 310 may monitor the operation of cores in pool of cores 370. In at least one embodiment, demand determiner 310 may measure the current load on pool of cores 370 by counting the total number of cycles consumed by each of the active cores during a previous time interval. The time intervals, or units of time, may comprise time divided into sets of fixed-length intervals, such as 8 second intervals. In some embodiments, demand determiner 310 may determine the demand on cores of pool of cores 370 by adding together the time base ticks of all of the active cores during an interval. Demand determiner 310 may then divide the total time base ticks by the number of active cores. Determining demand in this fashion may provide one representation of processor cycle consumption during the previous interval. Alternatively, in other embodiments, demand determiner 310 may simply measure the number of executed instructions during a unit of time.

Alternatively, in a further embodiment, demand determiner 310 may know the relative computing abilities of each of the cores in pool of cores 370, such as how many instructions per second each core may be capable of processing. Demand determiner 310 may monitor the actual execution of instructions of the cores and determine or measure usage percentages for each of the cores based on the actual instruction execution versus the known capacity. In yet a further embodiment, demand determiner 310 may comprise a characterization mechanism that determines power values for particular power states or frequencies of cores under load, based on data collected in the unit of time. For example, demand determiner 310 may measure, or possibly estimate, the number of watts consumed by each core in the unit of time. Some embodiments may even allow for direct determination of the current load on the cores of pool of cores 370. As one skilled in the art may readily appreciate, demand determiner 310 may measure demand on a pool of cores in a variety of different ways.

Using the information obtained from monitoring cores via demand determiner 310, core switcher 330 may determine which cores are lightly loaded, or which are executing relatively few instructions. Power controller 320 may use the demand or power characterization information provided by demand determiner 310 to sort the through the cores of pool of cores 370, determine which cores have sufficient available computational capacity remaining, determine which cores have computational load that may be shifted to one or more other cores, predict a time for load shifting, and limit execution of instructions to the smaller set or number of cores as part of the load shifting. When pool controller 320 shifts load from one core to another, pool controller 320 may cause core switcher 330 to place the inactive core into a lower power state to conserve power. When pool controller 320 determines that all cores of a processor are inactive, pool controller 320 may also cause core switcher 330 to place the inactive processor into a lower power state.

Some embodiments of apparatus 300 may comprise a dynamic voltage scaler 340 to scale voltages of one or more cores of pool of cores 370. Some embodiments of apparatus 300 may comprise a dynamic frequency scaler 350 to scale frequencies of one or more cores of pool of cores 370. Dynamic voltage scaler 340 and dynamic frequency scaler 350 may provide power management mechanisms that scale the cores and/or processors using dynamic voltage and frequency scaling and processor throttling on a shorter timescale than dynamic core pool management. In numerous embodiments, dynamic voltage scaler 340 and dynamic frequency scaler 350 may operate independently from core switcher 330 and/or power controller 320.

Numerous embodiments may also comprise a virtual processing unit controller 360 to change a number of virtual processing units available to execute instructions. For example, virtual processing unit controller 360 may change the number of virtual processing units available in response the demand of demand determiner 310. In other words, virtual processing unit controller 360 may increase the number of virtual processing units as demand increase, yet decrease the number as demand decreases. Additionally, as demand decreases, virtual processing unit controller 360 may change the number of virtual processing units in a manner that reduces the number of active ICs. When an IC becomes inactive, demand determiner 310 may detect the inactive condition. Power controller 320 may respond to the inactivity by causing core switcher 330 to switch the IC to a lower power state.

As more computational demands are placed on pool of cores 370, power controller 320 may respond by having core switcher 330 switch one or more cores from the lower power states to the higher power states to handle the additional computational demands. For example, demand determiner 310 may determine that computational demands are increasing by monitoring a number of commands that increasingly accumulate in a pending instruction queue. As core switcher 330 switches the power states of cores when for activation, virtual processing unit controller 360 may also increase the number of virtual processing units available to execute instructions. For example, virtual processing unit controller 360 may communicate with a virtual machine manager or an operating system and dynamically reconfigure the mapping of virtual processors as part of a dynamic partitioning scheme.

Depending on the embodiment, apparatus 300 may be designed using a set of premises related to determining system load. One premise may be that a collection of hardware threads running on a collection of cores may meet the load sufficiently, so that the power controller may select a set of resources to reduce the required power. Another premise may be that the load in a unit of time approximately equals the load in an immediately subsequent unit of time. For this premise to be accurate, an embodiment may need to limit the size of the unit of time, so that the load is approximately constant from one unit of time to the next. To avoid oscillations and to allow for the management of workload change over time, apparatus 300 may optionally use a rolling average of the load experienced over a window of a specific number of prior units of time. In other words, demand determiner 310 in some embodiments may not determine demand of cores in pool of cores 370 using a single unit of time, but average the demand over a series of units of time.

In some embodiments, demand determiner 310, power controller 320, and core switcher 330 may all reside in a single device, such as in a module coupled to processors 140 and 150, or as a set of coded instructions in virtual machine manager 114. Alternatively, in another embodiment, the elements of apparatus 300 may reside in two or more devices. For example, demand determiner 310 may comprise two separate circuits, one integrated with processor 140 and another integrated with processor 150. The separate elements of demand determiner 310 may communicate with power controller 320 and core switcher 330, which may reside in virtual memory manager 114.

The number of modules in an embodiment of apparatus 300 may vary. Some embodiments may have fewer modules than those module depicted in FIG. 3. For example, one embodiment may not have a dynamic frequency scaler 350, while another embodiment may not have a dynamic voltage scaler 340 or a virtual processing unit controller 360. Further, in some embodiments, some modules may be combined into a single module that performs multiple functions. For example, one embodiment may combine power controller 320 and core switcher 330 into a single module, whereupon the single module performs both functions of power controller 320 and core switcher 330.

Figure 4:
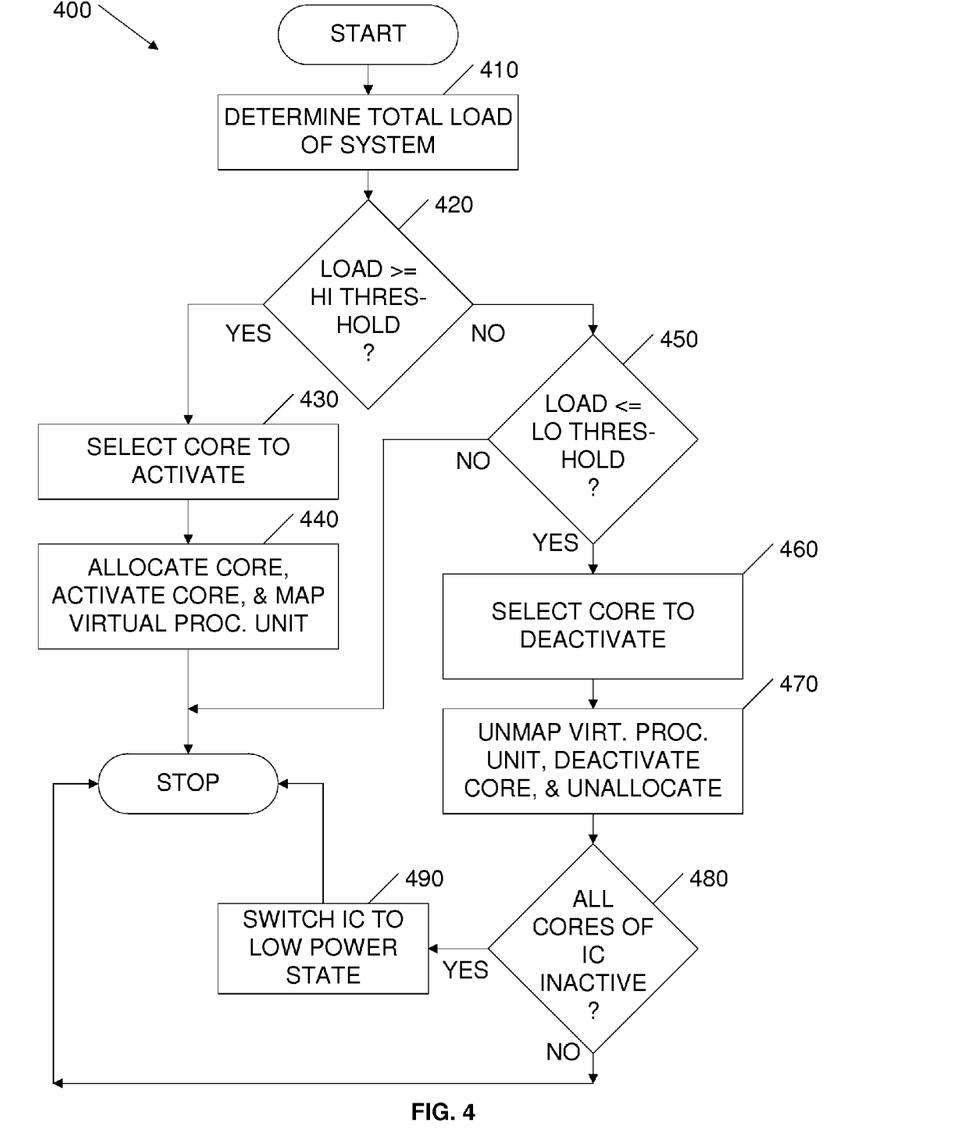
FIG. 4 depicts a flowchart illustrating how a system may determine a load, activate or deactivate cores based on the load, and change mapping of virtual processing units based on the load.

FIG. 4 depicts a flowchart 400 of a process illustrating how a system may determine load or demand of the system, activate or deactivate cores based on the load, and change mapping of virtual processing units based on the load. For example, one or more embodiments may be implemented as a computer program product comprising a computer readable storage medium including instructions that, when executed by a processor determine a load of a system, change the mapping of virtual processing units for virtual machines of the system, and manage the power states of cores and processors to conserve power and reduce heat in the system. Alternatively, the process of flowchart 400 may be implemented in hardware, such as in a state machine of an ASIC, such as ASIC 124 depicted in FIG. 1. For example, ASIC 124 may comprise a dynamic core pool management integrated circuit that works in conjunction with an operating system in memory 104, and potentially a virtual machine manager. ASIC 124 may control the overall power management of processors 140 and 150, including the control of any voltage and frequency scaling.

As illustrated in FIG. 4, the process may involve determining the total load of a system (element 410). For example, virtual machine manager 114 may measure the number of instructions passed to cores 142, 143, 152, and 153 in a unit of time. Virtual machine manager 114 may detect a large number of instructions being dispatched to cores 142, 143, 152, and 153 in a relatively short amount of time when demand or system load is high, yet detect a small number of instructions being dispatched to the cores when system load is low. As a couple of specific examples, virtual machine manager 114 may detect that numerous operating systems in memory 104 are dispatching instructions to cores 142, 143, 152, and 153 at an average rate of 20,000 MIPS (million instructions per second) at an instance when the total system load is relatively high and dispatching instructions to the cores at an average rate of 1,500 MIPS at another instance when the total system load is relatively low.

Based on the determined load (element 410), virtual machine manager 114 may determine whether the load is greater than or equal to a high threshold (element 420). For example, processor 140 may comprise two cores, cores 142 and 143. Processor 150 may also comprise two cores, cores 152 and 153. Each core may have a limited capacity to process a finite amount of instructions in a unit of time, such as a 1 second interval, without being overloaded. As applications and operating systems of system 100 increase in activity, virtual machine manager 114 may dispatch increasing numbers of instructions to cores 142, 143, 152, and 153 for consecutive intervals. The load characteristics for cores 142, 143, 152, and 153 may dictate that virtual machine manager 114 may dynamically manage the cores in a relatively efficient manner by activating and inactivating the cores at thresholds of 5,000 MIPS. In other words, virtual machine manager 114 may activate all four cores of processors 140 and 150 when virtual machine manager 114 dispatches instructions from operating systems and applications in memory 104 at a rate of 18,000 MIPS. However, whenever the rate drops below 15,000 MIPS and 10,000 MIPS, virtual machine manager 114 may deactivate cores of cores 142, 143, 152, and 153, decreasing the number of active cores to 3 and 2 cores, respectively.

Continuing with our example, system 100 may operate with cores 142 and 152 active, and cores 143 and 153 inactive. The total load of system 100 may increase, whereupon virtual machine manager 114 may determine that cores 142 and 152 are processing an average of 13,000 MIPS from operating systems and applications in memory 104, during an interval of 5 seconds. Virtual machine manager 114 may detect that 13,000 MIPS is greater than a threshold of 10,000 MIPS (element 420) and select one of the inactive cores of cores 143 and 153 to activate (element 430). Upon selecting one of the cores, virtual machine manager 114 may activate the core, change the mapping of the logical partition configuration to increase a virtual number of processing units to the newly activated core, and start allocating instructions to the core (element 440). Part of activating the core may comprise switching the core from a low power state to a high power state.

The total load of system 100 may remain around 13,000 MIPS for 30-40 seconds. During this time, virtual machine manager 114 may keep determining the total load (element 410) and comparing the total load to various preconfigured thresholds. Since the total load may hover around an average of 13,000 MIPS, virtual machine manager 114 may determine that the load is not greater than the next-highest threshold of 15,000 MIPS (element 420) and not less than the next-lowest threshold of 10,000 MIPS (element 450). Consequently, virtual machine manager 114 may not take any action of activating or deactivating cores of system 100 during the units of time transpiring in the 30-40 seconds.

After a period of activity, the total load of system 100 may decrease, whereupon virtual machine manager 114 may determine that cores 142 and 152 are processing an average of 9,000 MIPS from operating systems and applications in memory 104, during a subsequent interval of 5 seconds. Virtual machine manager 114 may detect that 9,000 MIPS is not greater than the next-highest threshold of 15,000 MIPS (element 420) but is less than the next-lowest threshold of 10,000 MIPS (element 450). Having a total load of system 100 lower than the next-lowest threshold, virtual machine manager 114 may select one of the active cores of cores 142, 143, 152, and 153 to deactivate (element 460). Upon selecting one of the cores, virtual machine manager 114 may limit or restrict instructions from being directed to the core, change the mapping of the logical partition configuration to decrease the virtual number of processing units for the core, and deactivate the core (element 470). Part of deactivating the core may comprise switching the core from a high power state to a low power state.

Upon deactivating a core (element 470), virtual machine manager 114 may then determine whether all cores of processor 140 and/or processor 150 are active (element 480). Continuing with our previous example, when the system load was averaging 13,000 MIPS, virtual machine manager 114 may have activated both cores of processor 140 and activated one core of processor 150. As the total load of system 100 dropped from an average of 13,000 MIPS to 9,000 MIPS, virtual machine manager 114 may have deactivated core 152 of processor 150. As a consequence, the only active cores may be cores 142 and 143 of processor 140 with both cores of processor 150 being inactive. Since processor 150 only has two cores in this embodiment, virtual machine manager 114 may determine that all cores of processor 150 are inactive (element 480) and switch processor 150 to a lower power mode or even into a sleep mode (490) to conserve power.

Flowchart 400 of FIG. 4 illustrates only one process. Alternative embodiments may implement innumerable variations of flowchart 400. For example, instead of selecting cores to activate and deactivate (elements 430 and 460), an alternative embodiment may select portions of cores to activate and deactivate based on the total system load. In other alternative embodiments virtual machine manager 114 may not completely deactivate a core based on total load of the system. For example, virtual machine manager may detect more threshold amounts and switch a core that is still active and processing instructions to a lower power state. In other words, the core may still be active, processing instructions at a slower rate but with less power.

Figure 5:
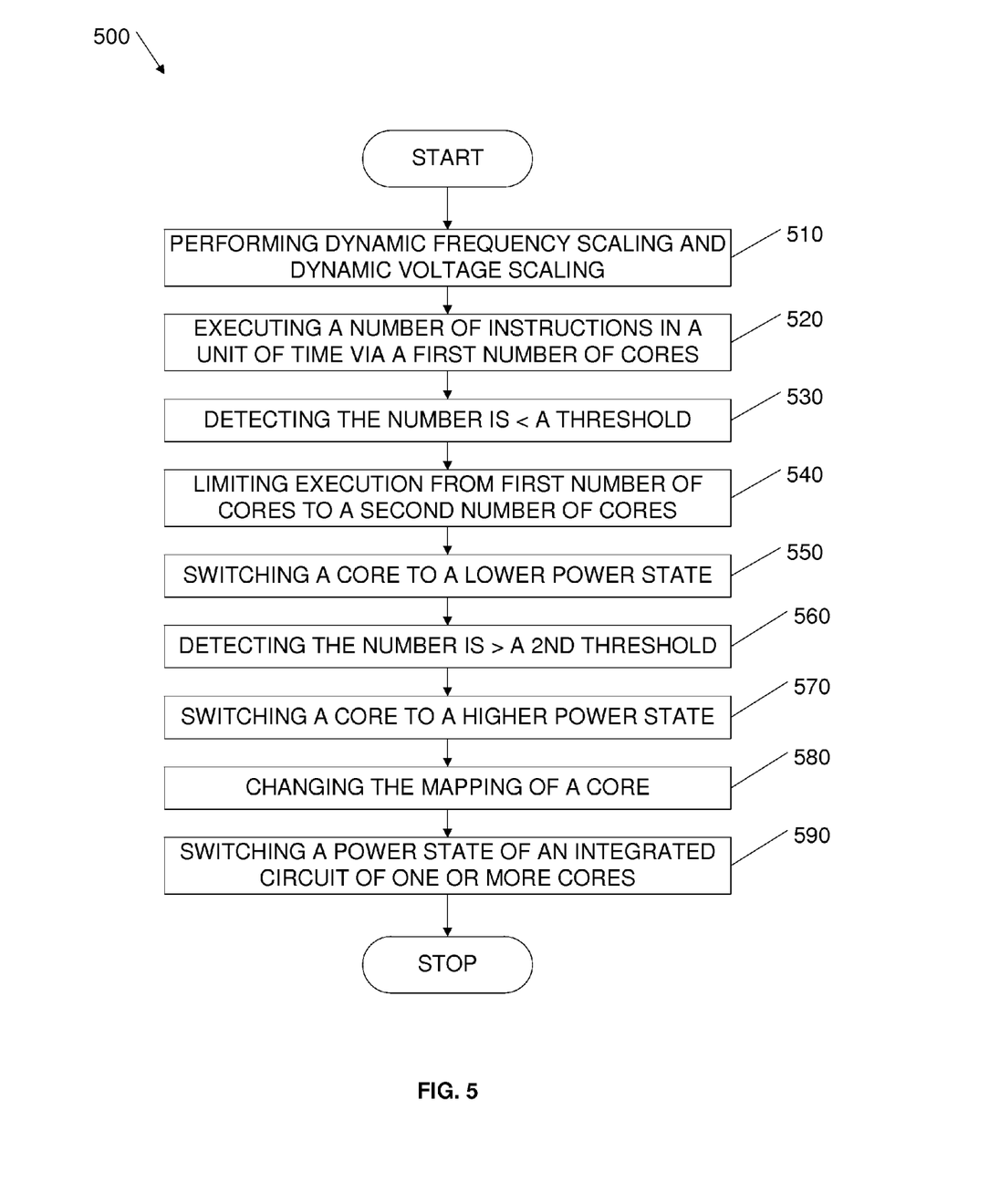
FIG. 5 illustrates a flowchart of a method for dynamically managing a core pool.

FIG. 5 illustrates a flowchart 500 of a method for dynamically managing a core pool. For example, an alternative embodiment of system 100 shown in FIG. 1 may have a virtual machine manager that dynamically manages a core pool comprising cores 142, 143, and two additional cores of processor 140, as well as cores 152, 153, and two additional cores of processor 150, wherein the virtual machine manager comprises a combination of integrated circuit elements of processor 140 and processor 150 that separate memory 104 into logical partitions and execute instructions from numerous operating systems loaded into the different memory partitions. A method according to flowchart 500 may begin with performing dynamic frequency and voltage scaling of processors and/or cores in a system (element 510). For example, as system 100 operates, module 146 may monitor the operations of processors 140 and 150, detect the demand of the processors as the demand increases and decreases, and adjust operating frequencies and voltage levels to reduce the overall power consumption of the processors.

As system 100 operates, seven cores of cores 142 and 152 may execute a number of instructions, such as a total number of 98,000 MIPS, in a period of 4 seconds (element 520). The virtual machine manager may determine that the number of 98,000 MIPS is less than a threshold of 118,000 (element 530). In response to the number being less than the threshold, the virtual machine manager may recognize an opportunity to conserve power and limit execution of instructions that continue to be dispatched to processors 140 and 150 from the seven cores to a smaller set of five cores (element 540). The virtual machine manager may then clear any core-specific cache items stored for one of the deactivated cores and switch the one core to a sleep state, but switch the other core into a standby state (element 550). For example, virtual machine manger may place one core into the sleep mode but the other core in the standby state, which may still be a lower power state than an idle state. Not switching both inactive processors to the sleep mode may improve the response of system 100 when demand increases, since switching the core from the standby state to a higher power state may occur in a shorter amount of time. Additionally, system 100 may not have waste time refreshing cache of the core placed into the standby state.

An embodiment of flowchart 500 continues by detecting that a number of instructions executed by cores of a system is greater than a second threshold (element 560) and switching a core to a higher power state (element 570). Continuing with our previous example, system 100 may continue executing instructions on the five cores. One or more applications of system 100 may experience a flurry of activity, resulting in the five cores processing 113,000 MIPS in a subsequent period of 4 seconds. The virtual machine manager may determine that the 113,000 MIPS is greater than a threshold of 112,000 MIPS and respond by switching the core in the standby state to a higher power state.

As the virtual machine manager switches one or more of the cores between the different power states, a virtual processing unit controller may also change the mappings of the cores (element 580). For example, the virtual processing unit controller may allocate additional virtual processing units to cores that are activated, while reducing the number of virtual processing units to cores that are deactivated. Additionally, as the virtual machine manager switches one or more of the cores between the different power states, the virtual machine manager may determine when power states of the ICs for the cores may be switched to conserve power (element 590). For example, if the system has four dual-core processors, the virtual machine manager may be able to reduce the number of active cores from eight cores, when the system is heavily loaded, to four cores, when many applications are idle. In reducing the number of cores from eight to four, the virtual machine manager may be able to switch the power states of the four inactive cores to lower power states.

The discussions for the embodiments of FIGS. 4 and 5 described a virtual machine manager, such as virtual machine manager 114, managing core pools. In alternative embodiments, the management function of the virtual machine manager may be performed in a variety of different locations. For example, in one or more embodiments, system 100 may have a virtual machine manager operating within an operating system. In another alternative embodiment, the module performing the actions of a virtual machine manager may be implemented as firmware-stored instructions executed by a dedicated and separate partition management processor. In other words, the actions performed by the virtual machine manager may be performed from a variety of different locations of a system in alternative embodiments.

Another embodiment is implemented as a program product for implementing systems, methods, and apparatuses described with reference to FIGS. 1-5. Embodiments may take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments may take the form of a computer program product accessible from a computer-usable or computer-readable medium providing program code for use by or in connection with a computer or any instruction execution system. For the purpose of describing the various embodiments, a computer-usable or computer readable medium may be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution. Input/output or I/O devices (including but not limited to keyboards, displays, pointing devices, etc.) can be coupled to the system either directly or through intervening I/O controllers.

Those skilled in the art, having the benefit of this disclosure, will realize that the present disclosure contemplates dynamically managing core pools. The form of the embodiments shown and described in the detailed description and the drawings should be taken merely as examples. The following claims are intended to be interpreted broadly to embrace all variations of the example embodiments disclosed.

Although the present disclosure and some of its advantages have been described in detail for some embodiments, one skilled in the art should understand that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
    detecting, by a virtual machine manager of a computing device, that a number of instructions executed by a plurality of virtual machines in a unit of time is less than a threshold;
    limiting, by the virtual machine manager, execution of instructions of the plurality of virtual machines from the first number of cores to a second number of cores in response to the detecting that the number of instructions executed is below the threshold, wherein the second number is less than the first number, wherein the limiting execution of instructions from the first number of cores to the second number of cores comprises the virtual machine manager changing mapping of a virtual processor unit of the first number of cores; and
    switching, by the virtual machine manager, a core of the first number of cores from a first power state to a second power state, wherein power consumption of the second power site is less than power consumption of the first power state.

2. The method of claim 1, further comprising performing, at least one of dynamic voltage scaling and dynamic frequency scaling of at least one core of the computing device within a second unit of time, wherein the second unit of time is smaller than the unit of time.

3. The method of claim 2, wherein the unit of time is between 1 second and 10 seconds, inclusive, and the second unit of time is 2 seconds or less.

4. The method of claim 1, further comprising executing a second number of instructions in a second unit of time and, in response to the second number being greater than a second threshold, switching at least one core from a third power state to a fourth power state, wherein power consumption of the fourth power state is greater than power consumption of the third power state.

5. The method of claim 1, wherein the limiting execution of instructions from the first number of cores to the second number of cores further comprises limiting execution of instructions from a first number of integrated circuits (ICs) to a second number of ICs responsive to the changing mapping of the virtual processor unit of the first number of cores resulting in at least one of the first number of ICs being inactive, wherein the second number of ICs is less than the first number of ICs, wherein the first number of ICs comprises the first number of cores, and wherein the second number of ICs comprises the second number of cores.

6. The method of claim 5, further comprising switching an IC of the first number of ICs from a first IC state to a second IC state, wherein power consumption of the second IC state is less than power consumption of the first IC state.

7. An apparatus, comprising:
a pool of cores;
a demand determiner in a virtual a machine manager in a computing device to determine a demand of a first number of cores within the pool of cores of the computing device, wherein the demand comprises execution of a number of instructions by a plurality of virtual machines in a unit of time by the first number of cores;
a core switcher in the virtual machine manager to switch power states of one or more cores of the first number of cores;
a power controller in the virtual machine manager to limit execution of instructions of the plurality of virtual machines from the first number of cores to a second number of cores in response to the detecting that the number of instructions executed is below the threshold, wherein the second number is less than the first number and to cause the core switcher to switch a core of the first number of cores from a first power state to a second power state in response to the demand determiner determining the demand is less than a threshold; and
a virtual processing unit controller in the virtual machine manager to change a number of virtual processing units allocated to the pool of cores, wherein the virtual processing unit controller is arranged to change the number in response the determined demand.

8. The apparatus of claim 7, further comprising at least one of a dynamic voltage scaler to scale a voltage of the core and a dynamic frequency scaler to scale a frequency of the core.

9. The apparatus of claim 8, wherein the at least one of the dynamic voltage scaler and the dynamic frequency scaler is arranged to operate independently of the core switcher.

10. The apparatus of claim 7, wherein the virtual processing unit controller is arranged to change allocation of virtual processing units from a first number of integrated circuits (ICs) to a second number of ICs responsive to the changing mapping of the virtual processor unit of the first number of cores resulting in at least one of the first number of ICs being inactive, wherein the second number of ICs is less than the first number of ICs, wherein the first number of ICs comprises the first number of cores, and wherein the second number of ICs comprises the second number of cores.

11. The apparatus of claim 7, wherein the virtual processing unit controller comprises a dynamic logic partitioning module.

12. The apparatus of claim 7, wherein, the virtual processing unit controller is arranged to change the number to meet a performance requirement of an operating system image.

13. The apparatus of claim 7, wherein the core switcher is arranged to switch the core from the second power state in response to the demand determiner determining the demand is greater than a second threshold, wherein further the apparatus comprises a server.

14. The apparatus of claim 13, the virtual processing unit controller to increase a number of virtual processing units available to execute instructions in response the switching of the core.

15. The apparatus of claim 7, wherein the demand determiner is arranged to determine the demand by counting a number of cycles of the pool.

16. A computer program product comprising
a non-transitory computer readable storage medium including instructions that, when executed by at least one processor:
detect, by a virtual machine manager of a computing device, that a number of instructions executed by a plurality of Virtual machines in a unit of time is less than a threshold;
limit, by the virtual machine manager, execution of instructions of the plurality of virtual machines from the first number of cores to a second number of cores in response to the detecting that the number of instructions executed is below the threshold, wherein the second number is less than the first number, wherein the limiting execution of instructions from the first number of cores to the second number of cores comprises the virtual machine manager changing mapping of a virtual processor unit of the first number of cores; and
change, by the virtual machine manager, a power state of a core in the first plurality of cores from a first power state to a second power state, wherein the change is in response to the detection of the number being less than the threshold, wherein power consumption of the second power state is lower than power consumption of the first power state.

17. The computer program product of claim 16, further comprising instructions that assign hardware threads and cores to partitions with spans greater than one in response to the detection of the number being less than the threshold, wherein the assignment of the hardware threads and the cores is to localize the partitions to a contiguous set of cores.

18. The computer program product of claim 16, wherein the limiting execution of instructions from the first number of cores to the second number of cores further comprises limiting execution of instructions from a first number of integrated circuits (ICs) to a second number of ICs responsive to the changing mapping of the virtual processor unit of the first number of cores resulting in at least one of the first number of ICs being inactive, wherein the second number of ICs is less than the first number of ICs, wherein the first number of ICs comprises the first number of cores, and wherein the second number of ICs comprises the second number of cores.

19. The computer program product of claim 18, wherein the limiting execution of instructions from the first number of cores to the second number of cores further comprises switching an IC of the first number of ICs from a first IC state to a second IC state, wherein power consumption of the second IC state is less than power consumption of the first IC state.

20. The computer program product of claim 16, further comprising further comprising instructions that perform dynamic voltage scaling and dynamic frequency scaling of at least one core of the computing device within a second unit of time, wherein the second unit of time is smaller than the unit of time.

* * * * *